(12) United States Patent
Turner et al.

(10) Patent No.: US 8,567,567 B1
(45) Date of Patent: Oct. 29, 2013

(54) WINDING TOOL FOR TORSION SPRING FOR SECTIONAL GARAGE DOOR

(76) Inventors: Ernest Scott Turner, Divide, CO (US); Jerry E. Trujillo, Broomfield, CO (US)

( * ) Notice: Subject to any disclaimer, the term of this patent is extended or adjusted under 35 U.S.C. 154(b) by 605 days.

(21) Appl. No.: 12/873,985

(22) Filed: Sep. 1, 2010

Related U.S. Application Data

(60) Provisional application No. 61/238,821, filed on Sep. 1, 2009.

(51) Int. Cl.
*F03G 1/00* (2006.01)
*E05F 11/00* (2006.01)

(52) U.S. Cl.
USPC .......................................... 185/39; 160/191

(58) Field of Classification Search
USPC ........ 185/37, 39, 9–11, 40; 49/197, 199, 200; 16/400, 401, DIG. 1; 160/191, 192, 315
See application file for complete search history.

(56) References Cited

U.S. PATENT DOCUMENTS

| | | | |
|---|---|---|---|
| 3,921,761 A | 11/1975 | Votroubek et al. | |
| 4,293,267 A | 10/1981 | Grove | |
| D275,138 S | 8/1984 | Bacon | |
| 4,472,910 A | 9/1984 | Iha | |
| 4,981,165 A | 1/1991 | Miller et al. | |
| 5,203,392 A | 4/1993 | Shea | |
| 5,636,678 A * | 6/1997 | Carper et al. | 160/191 |
| 5,865,235 A * | 2/1999 | Krupke et al. | 160/191 |
| 5,950,701 A * | 9/1999 | Rogers | 160/177 V |
| 5,964,268 A * | 10/1999 | Carper et al. | 160/191 |
| 6,327,744 B1 * | 12/2001 | Dorma | 16/197 |
| 6,408,925 B1 * | 6/2002 | Dorma | 160/191 |
| 6,508,461 B1 * | 1/2003 | Trevorrow et al. | 267/155 |
| 6,615,897 B2 * | 9/2003 | Dorma | 160/191 |

* cited by examiner

*Primary Examiner* — Alan Waits

(57) ABSTRACT

A winding tool for tightening a torsion spring for a sectional overhead door. The winding tool features two half hub assembles that wrap around an overhead door shaft, wherein a translational sprocket is disposed on the hub assemblies. The hub assemblies connect to the winding cone of a torsion spring via fingers that engage the hub assemblies. A winding box is removably attached to the hub assemblies. The winding box features a worm gear that engages the translational sprocket. A handle bar can be rotated with a drill to cause rotation of the worm gear. Rotation of the worm gear causes rotation of the translational sprocket and ultimate winding of the torsion spring.

14 Claims, 14 Drawing Sheets

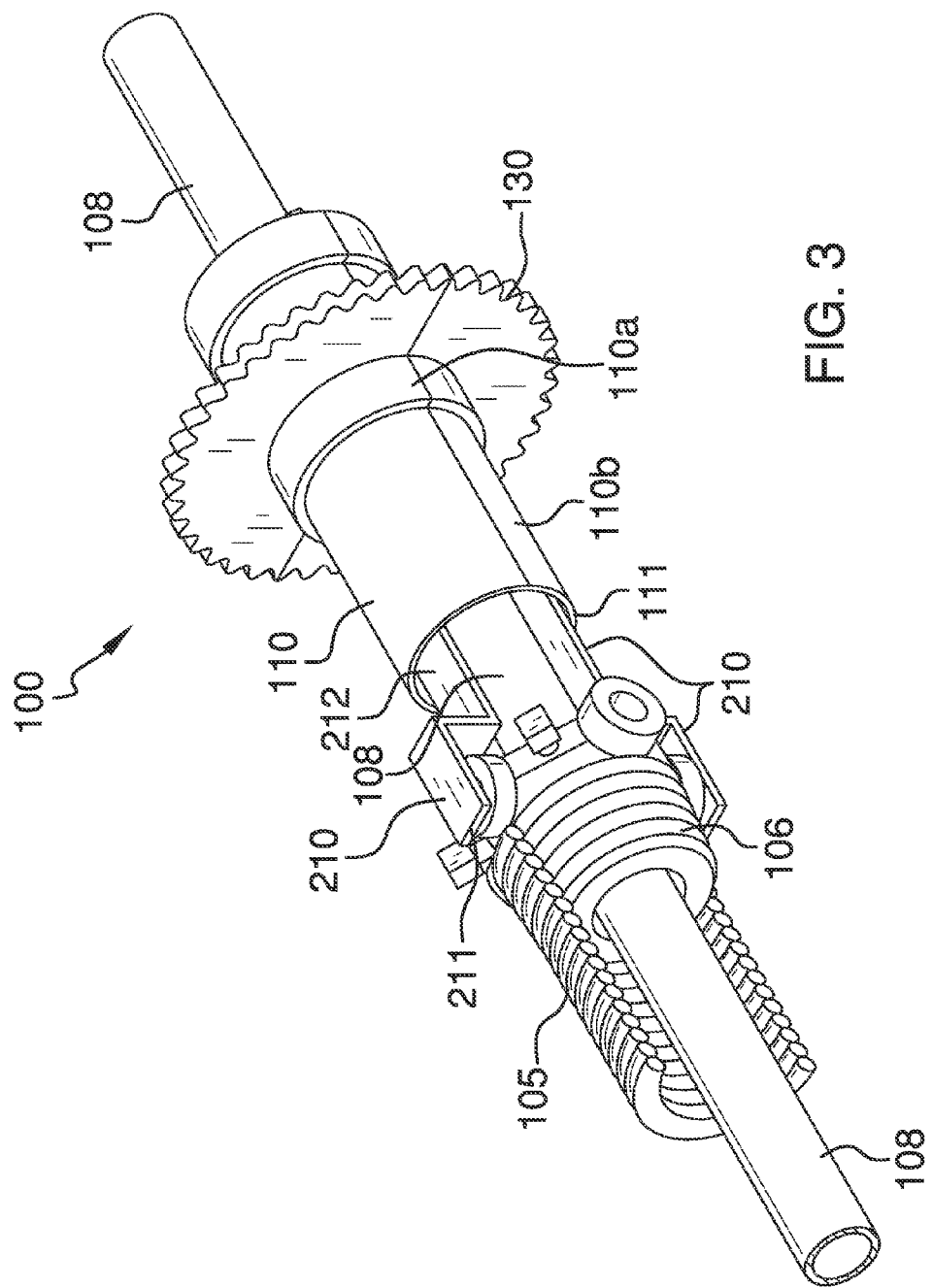

US 8,567,567 B1

WINDING TOOL FOR TORSION SPRING FOR SECTIONAL GARAGE DOOR

CROSS REFERENCE

This application claims priority to U.S. provisional application Ser. No. 61/238,821 filed Sep. 1, 2009, the specification of which is incorporated herein by reference in its entirety.

FIELD OF THE INVENTION

The present invention is directed to a tool for tightening (winding) torsion springs of sectional overhead doors.

BACKGROUND OF THE INVENTION

Tightening torsion springs of overhead doors is extremely dangerous and usually must be done by a professional. Even professionals may spend a great deal of time and effort fixing the torsion spring. The present invention features a winding tool for a torsion spring of a sectional overhead door that allows a user to easily and safely tighten the torsion spring with minimal time and effort.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a perspective view of the hub assembly of the winding tool of the present invention, wherein the hub assembly is engaged with the winding cone and the door shaft of the torsion spring.

DESCRIPTION OF PREFERRED EMBODIMENTS

Figure 1A:
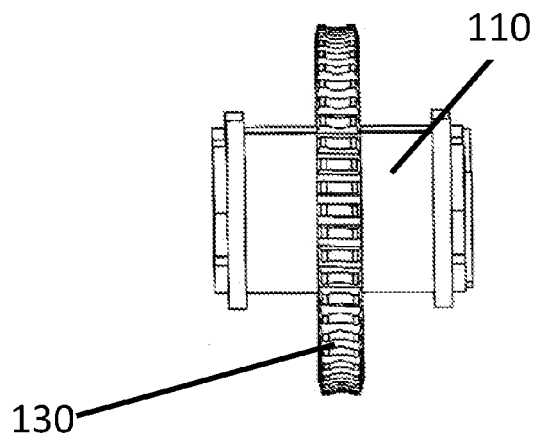
FIG. 1A is a side view of the hub assembly of the winding tool of the present invention, wherein the first half cylinder and the second half cylinder are connected.

Referring now to FIG. 1-11, the present invention features a winding tool 100 for torsion spring for a sectional overhead door. The winding tool 100 of the present invention comprises a hub assembly, for example a first half hub assembly and a second half hub assembly that interlock to form a complete hub assembly (see FIG. 1A, FIG. 1B, FIG. 2). The hub assembly is for wrapping around the overhead door shaft 108 (see FIG. 3, FIG. 4A). The hub assembly comprises a generally cylindrical extension 110 having a first end and a second end. The cylindrical extension 110 is divided into a first half cylinder 110a and a second half cylinder 110b.

Figure 2:
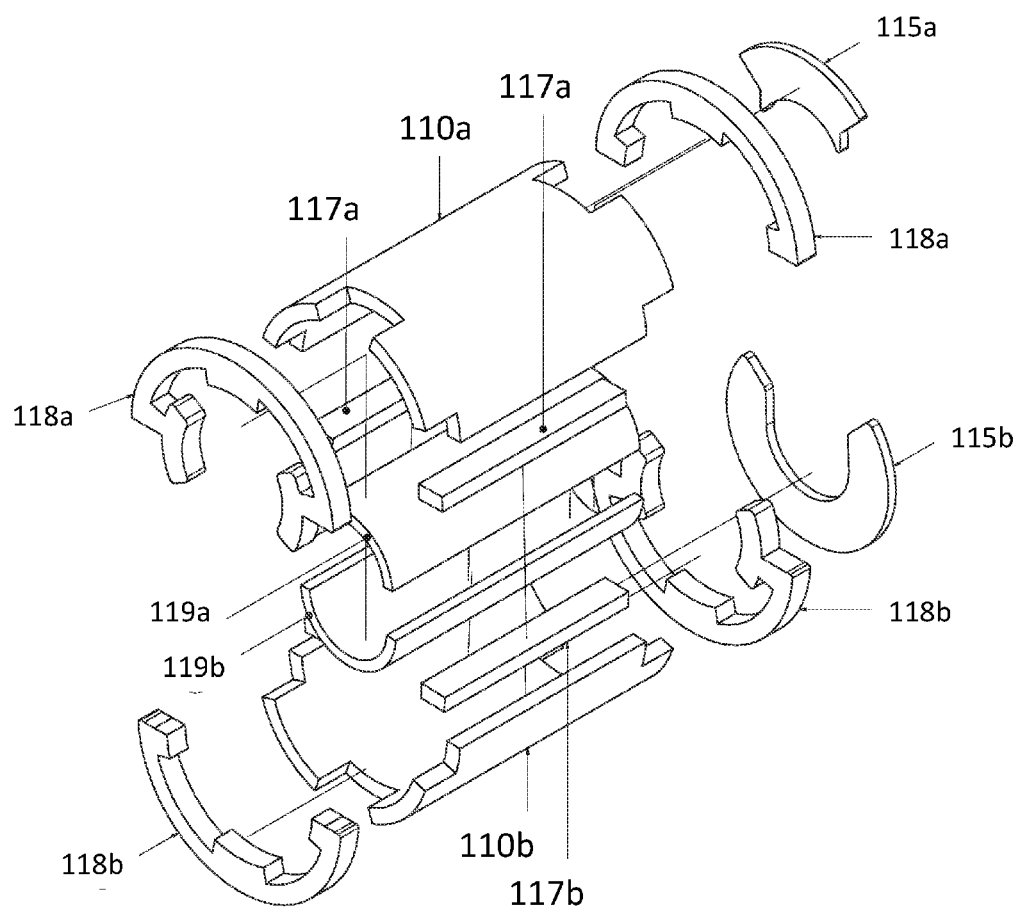
FIG. 2 is an exploded view of the hub assembly of the winding tool of the present invention.

A translational sprocket 130 is disposed on the cylindrical extension 110 in between the first end and the second end. The translational sprocket 130 is positioned generally perpendicularly to the cylindrical extension 110. The translational sprocket 130 is also divided into a first half sprocket 130a and a second half sprocket 130b, the first half sprocket 130a being disposed on the first half cylinder 110a and the second half sprocket 130b being disposed on the second half cylinder 110b. FIG. 2 shows an exploded view of the hub assembly, wherein the first half cylinder 110a (and first half sprocket 130a) is separate from the second half cylinder 110b (and the second half sprocket 130b). In some embodiments, the translational sprocket 130 has 50 teeth. In some embodiments, the translational sprocket 130 has less than or more than 50 teeth.

Figure 1B:
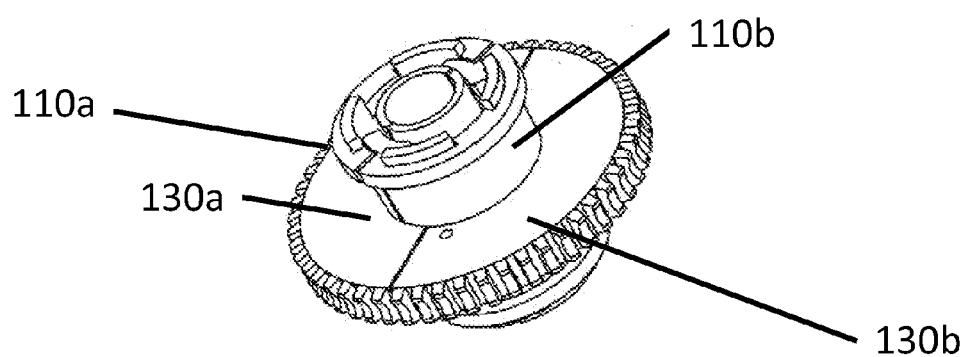
FIG. 1B is a perspective view of the hub assembly of FIG. 1, wherein the first half cylinder and the second half cylinder are connected.

The first half cylinder 110a and second half cylinder 110b can be secured together via a locking means, for example the two half cylinders 110 can interlock to remain secured together. FIG. 2 shows a configuration of the half cylinders 110 where the half cylinders 110 can interlock. For example, half rings 118 may be disposed (e.g., welded) on the ends of the half cylinders 110 that can interlock with each other (see FIG. 2). The half rings 118 may have various tongues or protrusions that can interlock with spaces, grooves, and/or slots of another half ring. FIG. 2 also shows an inner hub disposed inside the cylinder 110, for example a first inner hub 119a is disposed inside the first half cylinder 110a and a second inner hub 119b is disposed inside the second half cylinder 110b. One or more spacers 117 may be used to help assemble the cylinders 110 together. End caps 115 may be disposed on one or both of the outer ends of the half rings 118. FIG. 1A and FIG. 1B show the half cylinders 110 assembled. The components of the first half hub assembly (e.g., the first half cylinder 110a, the first inner hub 119a, the first half rings 118a on the ends of the first half cylinder 110a, the first end cap 115a, and/or the first spacers 117a may be welded together. The components of the second half hub assembly (e.g., the second half cylinder 110b, the second inner hub 119b, the second half rings 118b on the ends of the second half cylinder 110b, the second end cap 115b, and/or the second spacers 117b may be welded together.

The rings 118 may help interlock the half cylinders 110 as well as help keep the half cylinders 110 from sliding side to side.

Figure 4A:
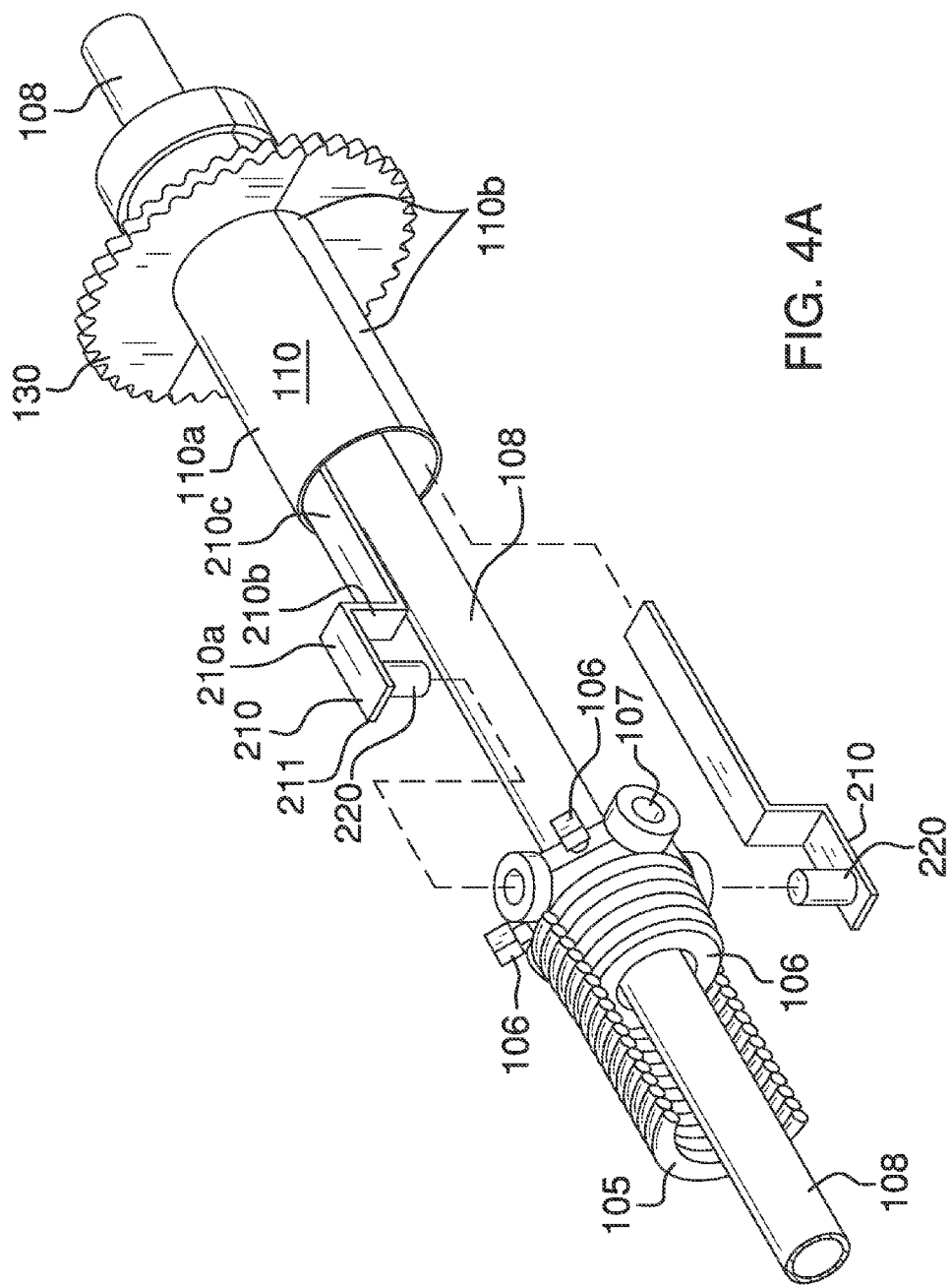
FIG. 4A is an exploded view of the hub assembly of FIG. 3.
Figure 4B:
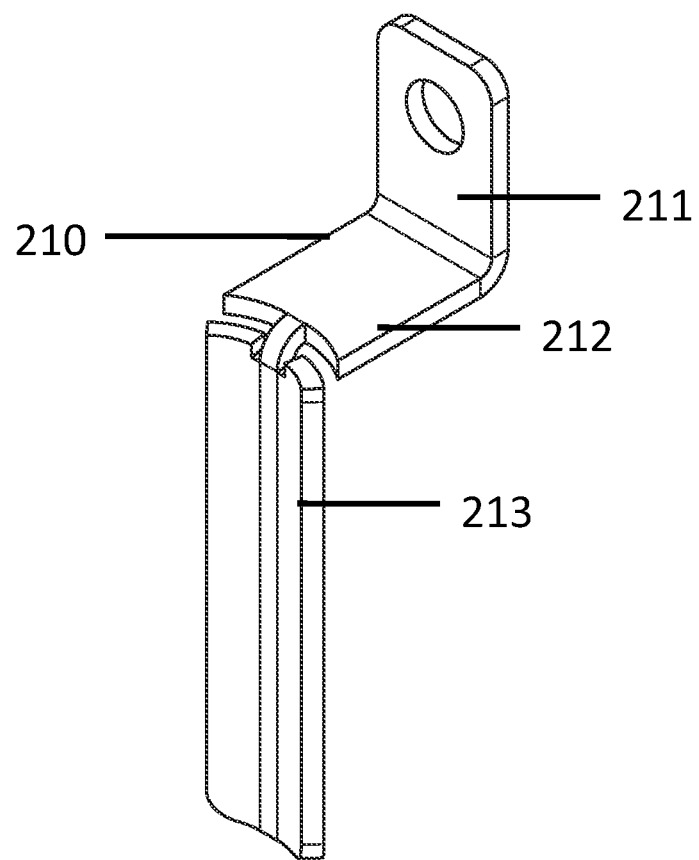
FIG. 4B is a perspective view of a finger of the hub assembly of the winding tool of the present invention.
Figure 5:
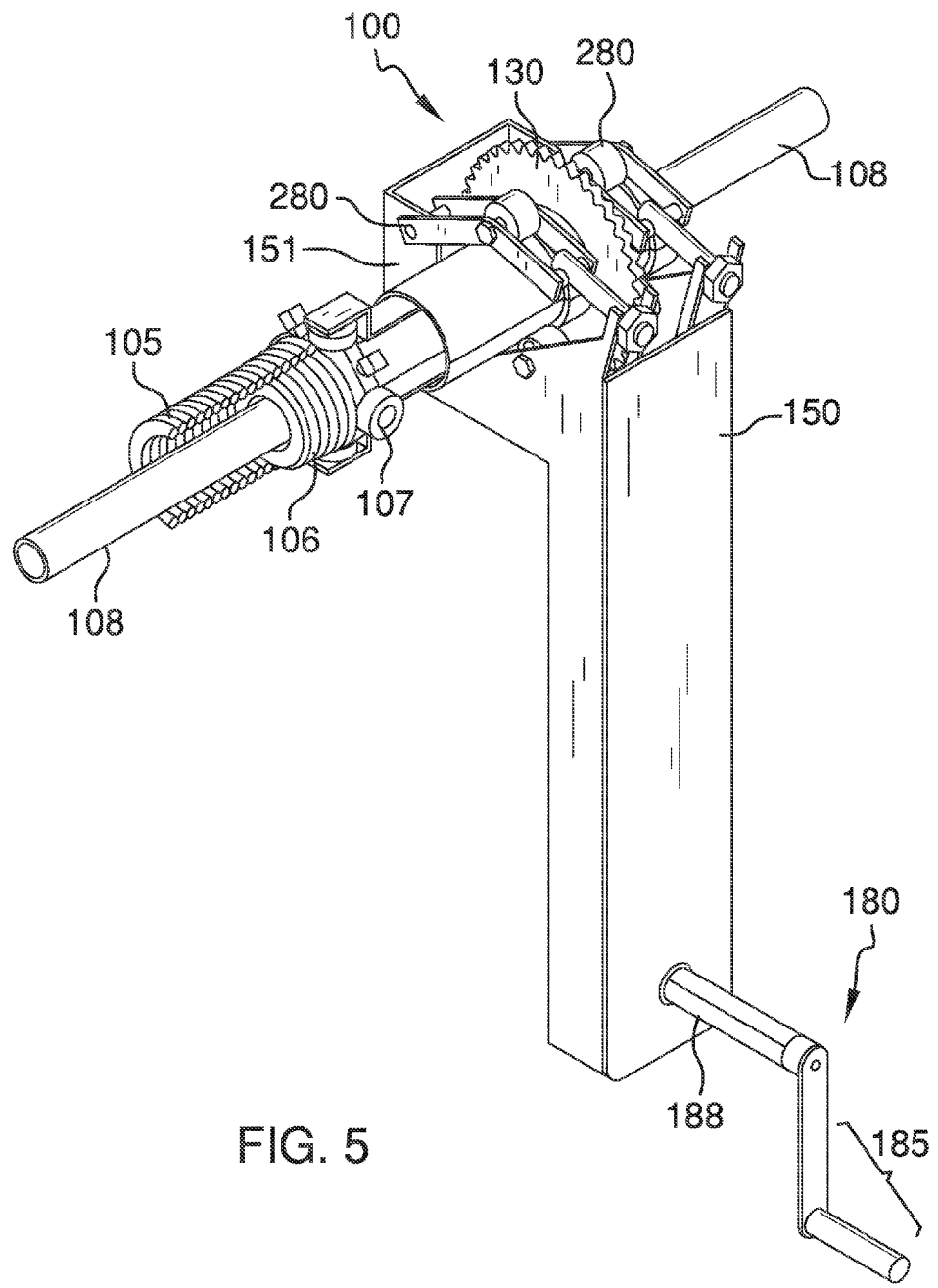
FIG. 5 is a perspective view of an embodiment of the winding tool of the present invention, wherein the tool is engaged with the winding cone and the door shaft of the torsion spring.

Referring now to FIG. 3 and FIG. 4A, the hub assembly of the winding tool 100 is shown wrapped around an overhead door shaft 108. The hub assembly is engaged with the winding cone 106 of the torsion spring 105. Overhead door shafts 108, torsion springs 105, and winding cones 106 (and sizes thereof) are well known to one of ordinary skill in the art. The first end 111 of the cylindrical extension 110 is not snugly fit around the door shaft 108. A space exists between the walls of the cylindrical extension 110 and the door shaft 108.

The winding tool 100 further comprises a plurality of fingers 210 (e.g., see FIG. 4B) used to attach the cylindrical extension 110 to the winding cone 106 of the torsion spring 105. The fingers 210 may be attached to the cylindrical extension 110 or the fingers 210 may be separate pieces. The fingers 210 are shaped so that the first ends 211 are for connecting to the holes 107 of the winding cone 106 and the second ends 212 are adapted to be slid into the space between the first end 111 of the cylindrical extension 110 and the door shaft 108. A pin 220 is disposed on the first end 211 of each finger 210 for insertion into the holes 107 of the winding cone 106. In some embodiments, the fingers 210 may comprise a first flat or concave/curved bar 210a generally perpendicularly attached to a second flat or concave/curved bar 210b (e.g., end to end), and the second flat or concave/curved bar 210b is generally perpendicularly attached to a third flat or concave/curved bar 210c (e.g., end to end). The third bar 210c is engaged with the first end of the cylindrical extension 110 (e.g., inserted into finger cavities disposed on the inner surface of the cylindrical extension 110), and the first bar 210a (e.g., with pins 220) engages the holes 107 of the winding cone 106.

Referring now to FIG. 5-8, the winding tool 100 of the present invention further comprises a winding box 150 that controls the rotation of the translational sprocket 130. The winding box 150 is attachable to the hub assembly (e.g., translational sprocket 130). When the translational sprocket 130 is rotated in a first direction, the cylindrical shaft 110 rotates in the first direction, causing the winding cone 106 to turn in the first direction. When the translational sprocket 130 is rotated in a second direction, the cylindrical shaft 110 rotates in the second direction, causing the winding cone 106 to turn in the second direction. FIG. 8A-8D shows an alternative version of the winding box 150 (e.g., with a clamp assembly).

The winding box 150 has an open top end 154, a middle portion, a bottom end, and an inner cavity. Generally, the winding box 150 is attached to the cylindrical extension 110 such that the first side 151 of the winding box 150 faces the first end 111 of the cylindrical extension 110, the second side 152 of the winding box 150 faces the second end of the cylindrical extension 110, and the translational sprocket 130 (or a portion thereof) is generally within the inner cavity (of the top end) of the winding box 150. In some embodiments, the winding box 150 has indentations 153 disposed in the first side 151 and in the second side 152 at the top end 154. The cylindrical extension 110 can rest in the indentations 153 at the top end 154 (the translational sprocket 130 in between the first side 151 and second side 152 of the winding box 150).

Figure 6:
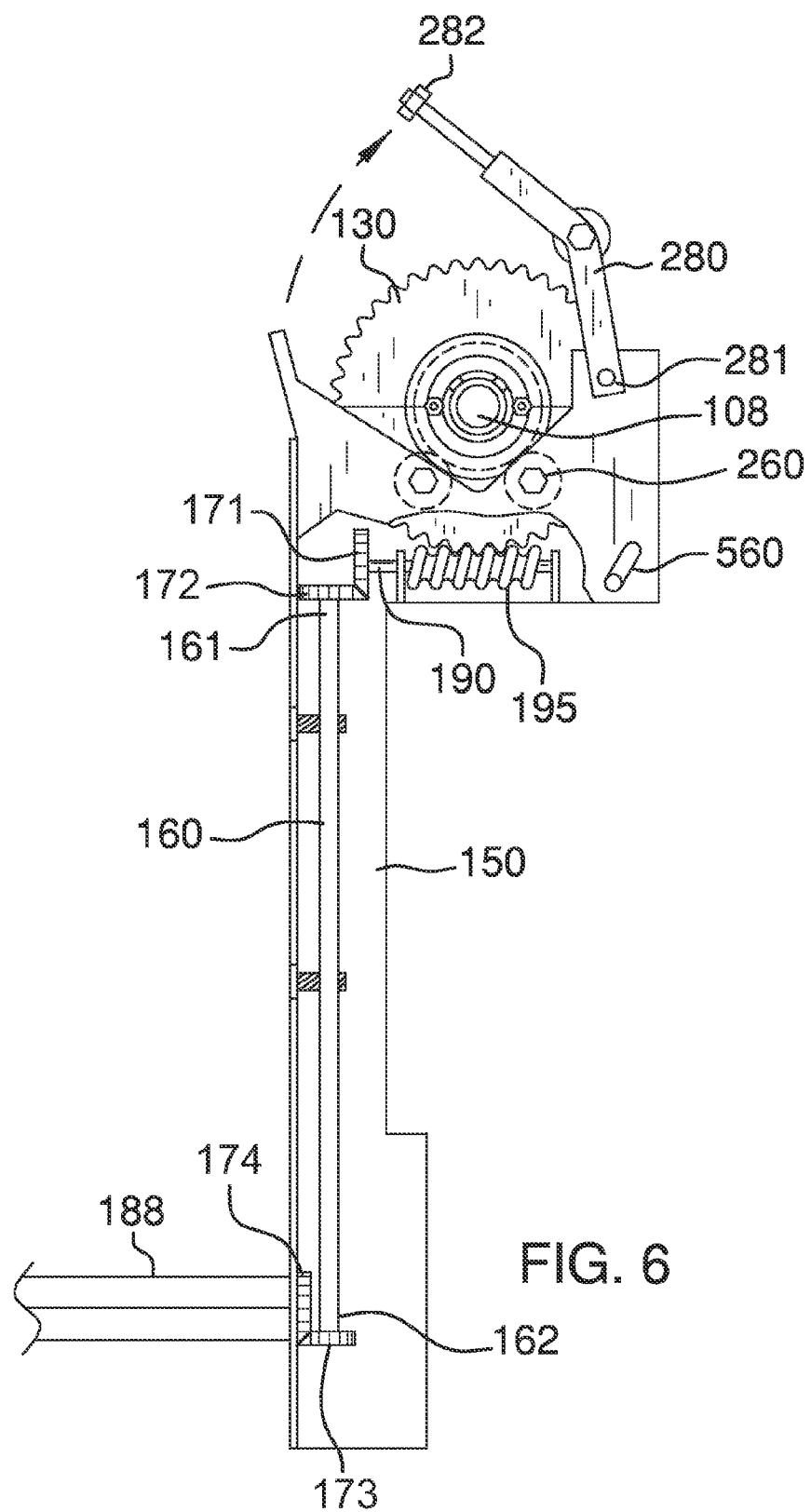
FIG. 6 is a side and internal view of an embodiment of the winding tool of the present invention, wherein the tool is engaged with the winding cone and the door shaft of the torsion spring.

In some embodiments, a first pair of bearings 260 (e.g., see FIG. 7) is disposed in the inner cavity of the top end of the winding box 150 (e.g., attached to the first side 151) below the indentation 153, and a second pair of bearings is disposed in the inner cavity of the top end of the winding box 150 (e.g., attached to the second side 152) below the indentation 153. The cylindrical extension 110, when lying in the indentations 153, can easily rotate when supported by the bearings. FIG. 6 shows the cylindrical extension 110 resting atop the bearings 260.

Disposed in the inner cavity of the top end of the winding box 150 below the bearings 260 is a worm gear 195. The worm gear 195 has a first end and a second end, the first end facing the third side of the winding box 150 front end of the winding box) and the second end facing the fourth side of the winding box 150 (e.g., back end of the winding box 150). When the hub assembly is engaged with the winding box, the teeth of the translational sprocket 130 engages the teeth of the worm gear 195. When the worm gear 195 is rotated, the translational sprocket 130 rotates. Disposed on the first end of the worm gear 195 is a worm gear shaft 190. A first gear 171 is disposed on the worm gear shaft 190.

The winding box 150 further comprises a handle component 180 disposed at or near the bottom end of the winding box 150. The winding box 150 further comprises a winding shaft 160 disposed in the inner cavity, extending from the bottom end through the middle portion and to the top end of the winding box 150. The winding shaft 160 has a first end 161 and a second end 162, wherein the first end 161 is for engaging the worm gear 195 and the second end 162 of the winding shaft 160 is for engaging the handle component 180. For example, a second gear 172 is disposed on the first end 161 of the winding shaft 160, wherein the second gear 172 engages the first gear 171 disposed on the worm gear shaft 190 of the worm gear 195. A third gear 173 is disposed on the second end 162 of the winding shaft 160, wherein the third gear 173 engages a fourth gear 174 disposed on the handle component 180.

The winding shaft 160 can be rotated by the handle component 180). In some embodiments, the handle component 180 comprises a handle piece 185 that is removably attached to a handle bar 188. The handle bar 188 has the fourth gear 174 disposed on its first end (the fourth gear 174 engages the third gear 173 on the winding shaft 160) and the second end of the handle bar 188 extends outwardly from the winding box 150. In some embodiments, the handle bar 188 is generally perpendicular to the winding shaft 160. The handle piece 185 may be attached to the second end of the handle bar 188.

When handle bar 188 is rotated (e.g., via the handle piece 185), the handle bar 188 causes the winding shaft 160 to rotate. The rotation of the winding shaft 160 rotates the worm gear 195, which causes the translational sprocket 130 (and further the winding cone 106) to rotate. Thus, the winding tool 100 of the present invention may be used to wind and unwind a torsion spring 105 by turning the handle component 180.

In some embodiments, a drill can be engaged with the handle bar 188 instead of a handle piece 185. The drill can rotate the handle bar 188 as needed.

Generally, the worm gear 195 and translational sprocket 130 may provide a 50:1 ratio of rotation, for example 50 rotations of the worm gear 195 translates into 1 rotation of the translational sprocket (e.g., the translational sprocket 130 has 50 teeth, for example). The present invention is not limited to this rotation ratio and configuration.

Figure 8A:
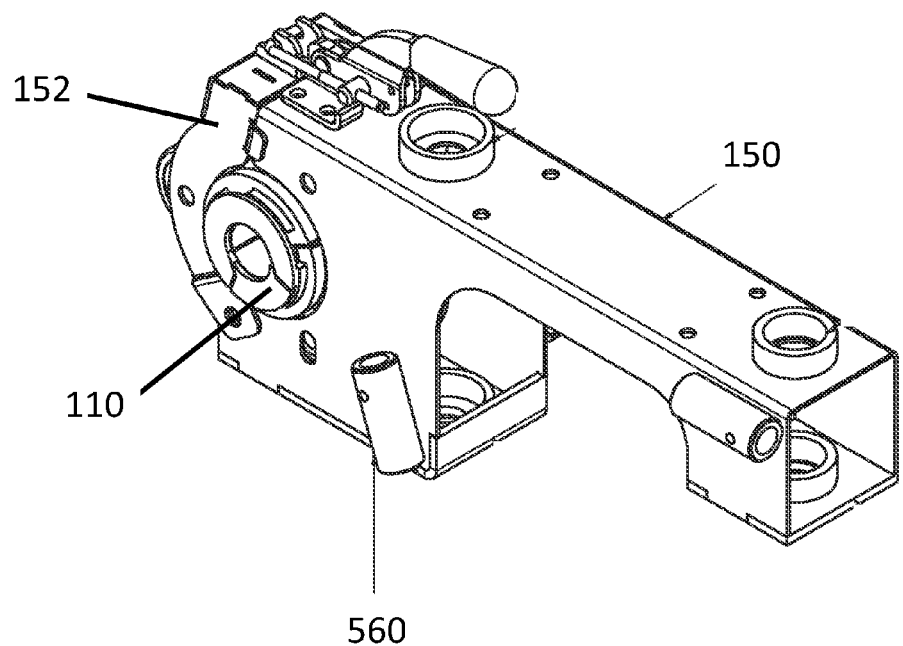
FIG. 8A is a perspective view of a winding box of the winding tool of the present invention. The winding box is attached to the hub assembly.
Figure 8B:
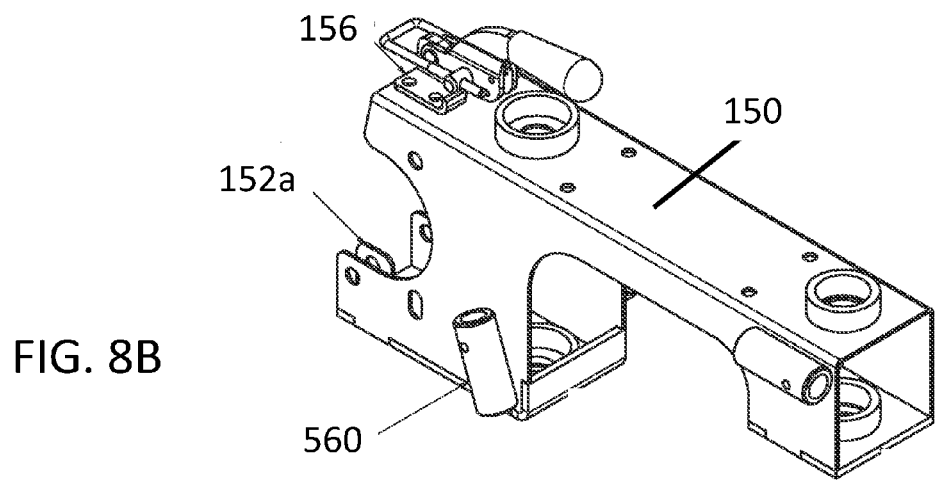
FIG. 8B is a perspective view of a winding box of the winding tool of the present invention. The winding box is not attached to the hub assembly.
Figure 8C:
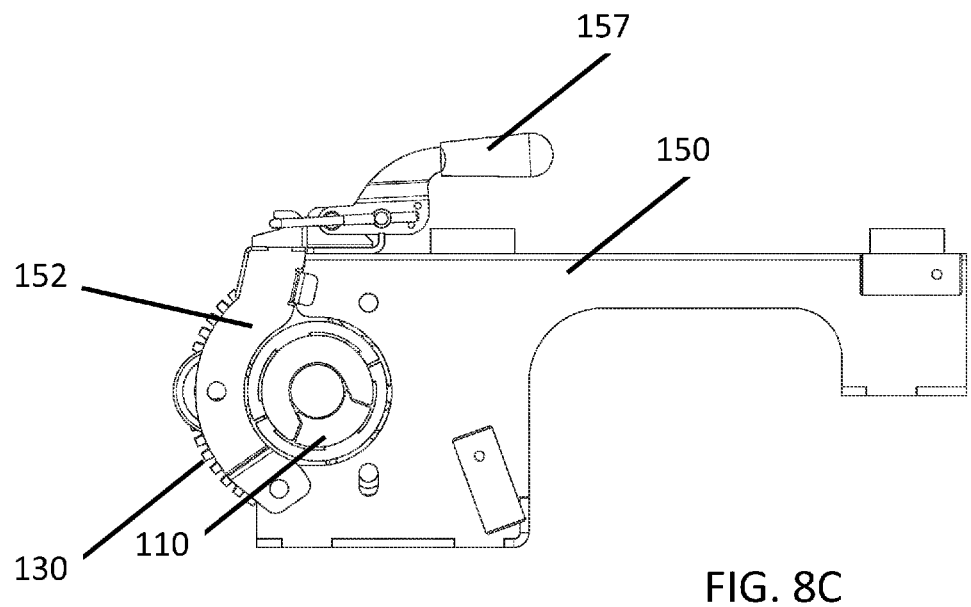
FIG. 8C is a side view of a winding box of the winding tool of the present invention.

FIG. 8A-8D shows an alternative version of the winding box 150. A clamp assembly may be disposed on the top end of the winding box 150 for securing the winding box 150 to the cylindrical extension 110 and translational sprocket 130. For example a clamp lever 152 is pivotally attached to the top end of the winding box 150, for example via a pivot component 152a (e.g., at the top end near the third side of the winding box). The clamp lever 152 can pivot between an open position and a closed position. FIG. 8A shows the clamp lever in the closed position around the hub assembly. The clamp lever 152 can be secured in the closed position via a locking system, for example a latch component 156. FIG. 8E shows an example of the clamp lever 152 of the winding box 150. The clamp lever 152 may be a single unit with two halves connected via a connecting bar. The two halves may respectively hold down the first end of the cylinder 110 and the second end of the cylinder 110 (e.g., opposite sides of the translational sprocket 130, see FIG. 8D). In some embodiments, the latch component 156 comprises a clamp handle 157. The clamp handle 157 may function to lock and unlock the latch component 156 respectively securing and freeing the clamp lever 152.

Figure 8D:
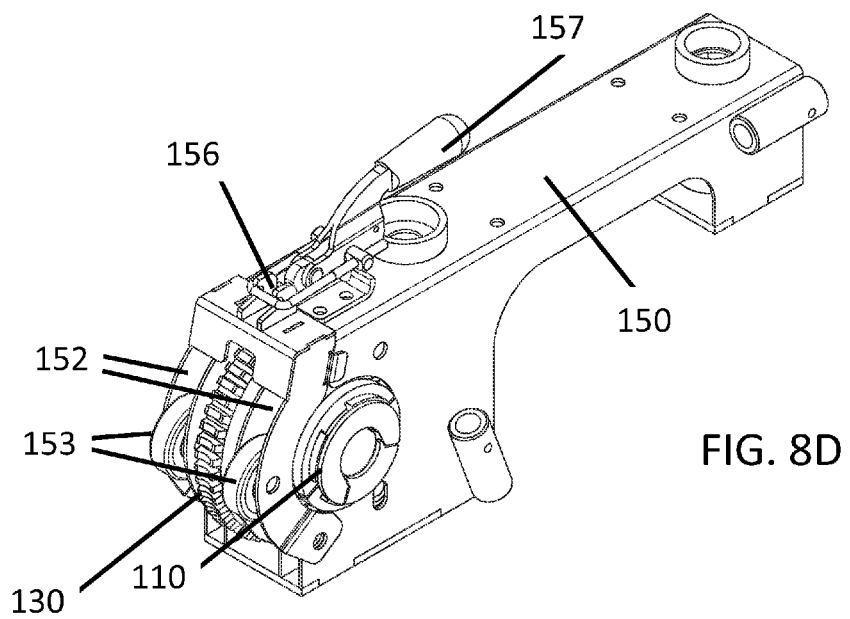
FIG. 8D is a perspective view of a winding box of the winding tool of the present invention. The winding box is attached to the hub assembly.
Figure 8E:
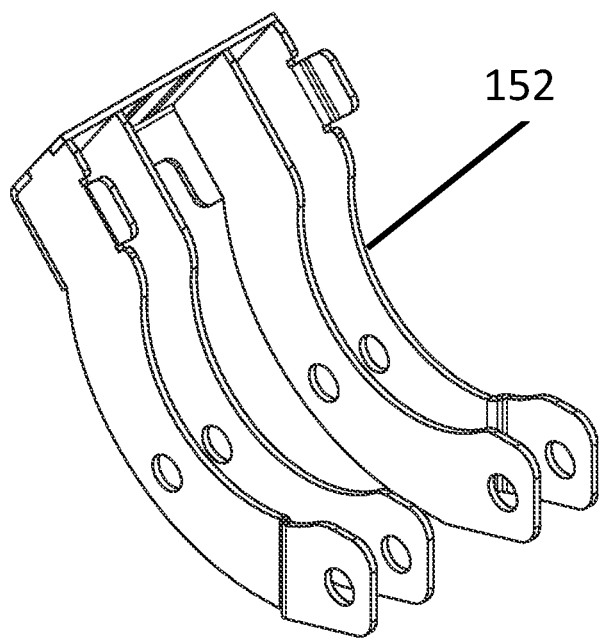
FIG. 8E is a perspective view of the clamp lever of the winding box of FIG. 8A.

As shown in FIG. 8D, upper bearings 153 may be disposed on the clamp lever 152, for example a first upper bearing 153 disposed on the first half of the clamp lever 152 and a second upper bearing 153 disposed on the second half of the clamp lever 152. The upper bearings 153 may contact the cylindrical extension 110 and help secure the winding box 150 to the hub assembly while allowing rotation of the cylindrical extension 110 and translational sprocket 130.

Figure 7:
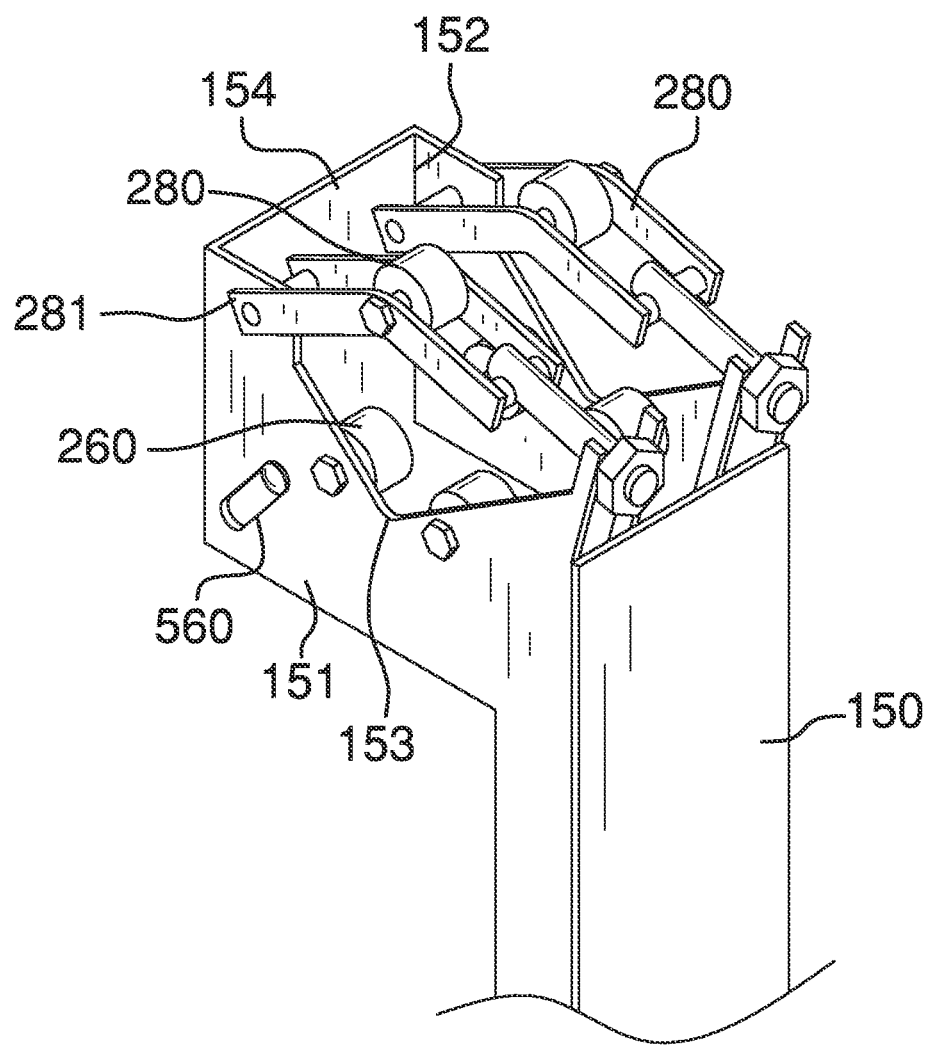
FIG. 7 is a perspective view of the winding tool of FIG. 5. The tool is not engaged with the door shaft.

Alternatively, as shown in FIG. 7, in some embodiments, the winding box 150 further comprises a first roller bar 280 and a second roller bar 280 each pivotally attached to the winding box 150 (e.g., the first ends 281 of the roller bars 280 are attached to the back end of the winding box 150 near the top end 154). The roller bars 280 are designed to wrap over the cylindrical extension 110 when the cylindrical extension 110 is lying in the indentations 153 to attach the winding box 150 to the cylindrical extension 110. When in place, the roller bars 280 allow the cylindrical extension 110 to rotate. The roller bars 280 can move between an unlocked position and a locked position. In the locked position, the second ends 282 of the roller bars 280 are secured to the front end of the winding box via a securing means (e.g., a clamp mechanism, a hook mechanism, a clasp mechanism, etc.). In the unlocked position, the second ends 282 of the roller bars 280 are not secured to the winding box 150 and the cylindrical extension 110 can be inserted or removed from the indentations 153 of the winding box 150. The translational sprocket 130 is positioned in between the first roller bar and second roller bar.

Assembly and Use

In some embodiments, to attach the winding tool 100 of the present invention to the torsion spring unit (e.g., door shaft 108, winding cone 106), a user can take the first half cylinder 110a of the cylindrical extension 110 (e.g., with the finger 210, e.g., slid into the finger cavity) and the second half cylinder 110b of the cylindrical extension (e.g., with the finger 210, e.g., slid into the finger cavity) and engage the fingers with the winding cone 106 while placing the two half cylinders 110 around the door shaft 108. When the half cylinders 110 and fingers 210 are in place, the half cylinders 110 can be interlocked (e.g., the first half cylinder 110a is shifted in a first direction and the second half cylinder 110b is shifted in the second opposite direction until the cylinders snap in place). The size of the finger depends on the size of the torsion spring 105.

Next, the winding box 150 can be attached to the cylindrical extension 110. For example, the clamp lever 152 can be opened (or the roller bars 280 may be moved to the unlocked position) and the cylindrical extension 110 placed into the indentations 153 in the winding box 150 (e.g., the translational sprocket 180 is in between the two roller bars 280 or the two halves of the clamp lever 152). The clamp lever 152 or roller bars 280 can then be locked over the hub assembly. In some embodiments, a drill or a handle component 180 is then attached to the winding box 150 (e.g., in FIG. 5 a handle component is attached, alternatively the drill can engage the handle bar 188). The drill or handle component 180 can then be turned in the direction of the user's needs.

Once the spring is wound, a user can use drill and ratchet to tighten the spring. Then, the device may be relaxed slightly with the drill or handle and the winding box and hub assembly can be removed.

Without wishing to limit the present invention to any theory or mechanism, it is believed that having the cylindrical extension 110 divided into two halves is advantageous because it allows the winding tool 100 to be easily fitted (e.g., mounted on the door shaft 108 and attached to the winding cone 106). A user can place the first half cylinder 110a on the door shaft 108 and insert the finger 210 in the winding cone 106 and first half cylinder 110a appropriately. Then, the second half cylinder 110b can be connected to the first half cylinder 110a.

Figure 9:
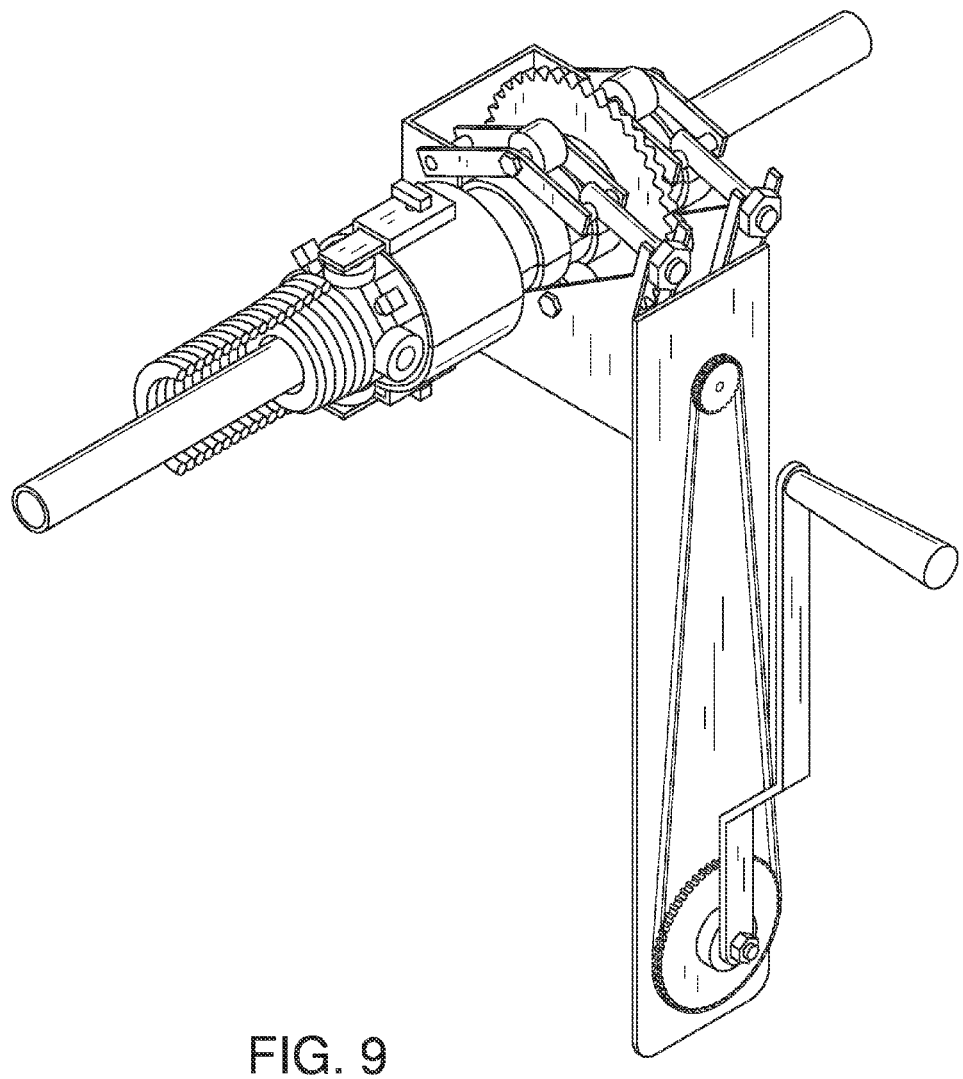
FIG. 9 is a perspective view of an alternative embodiment of the winding tool of the present invention comprising a chain rotatable via the handle component. Rotating the chain translates into the rotation of the cylindrical extension and winding cone.
Figure 10:
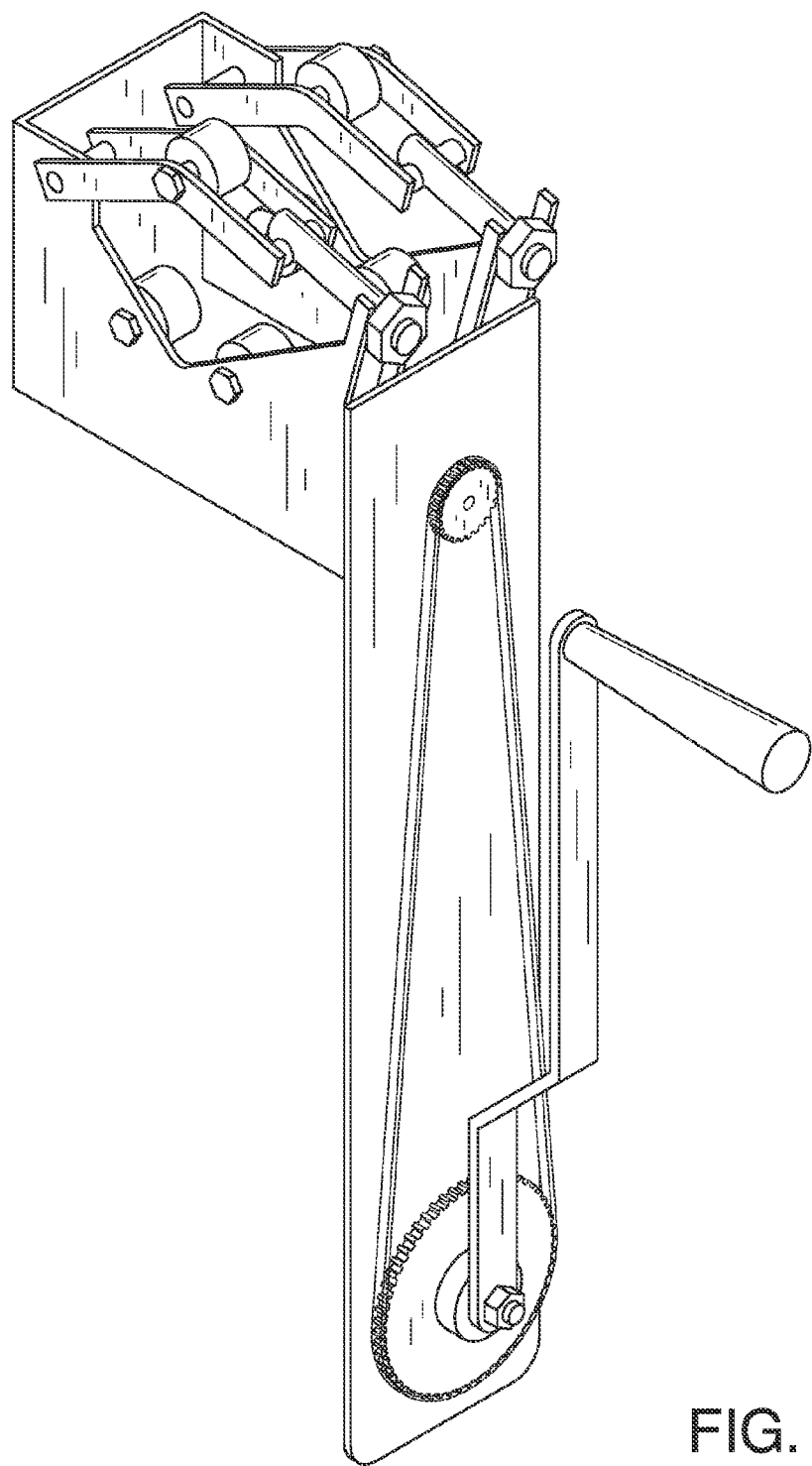
FIG. 10 is a perspective view the winding tool of FIG. 9.
Figure 11:
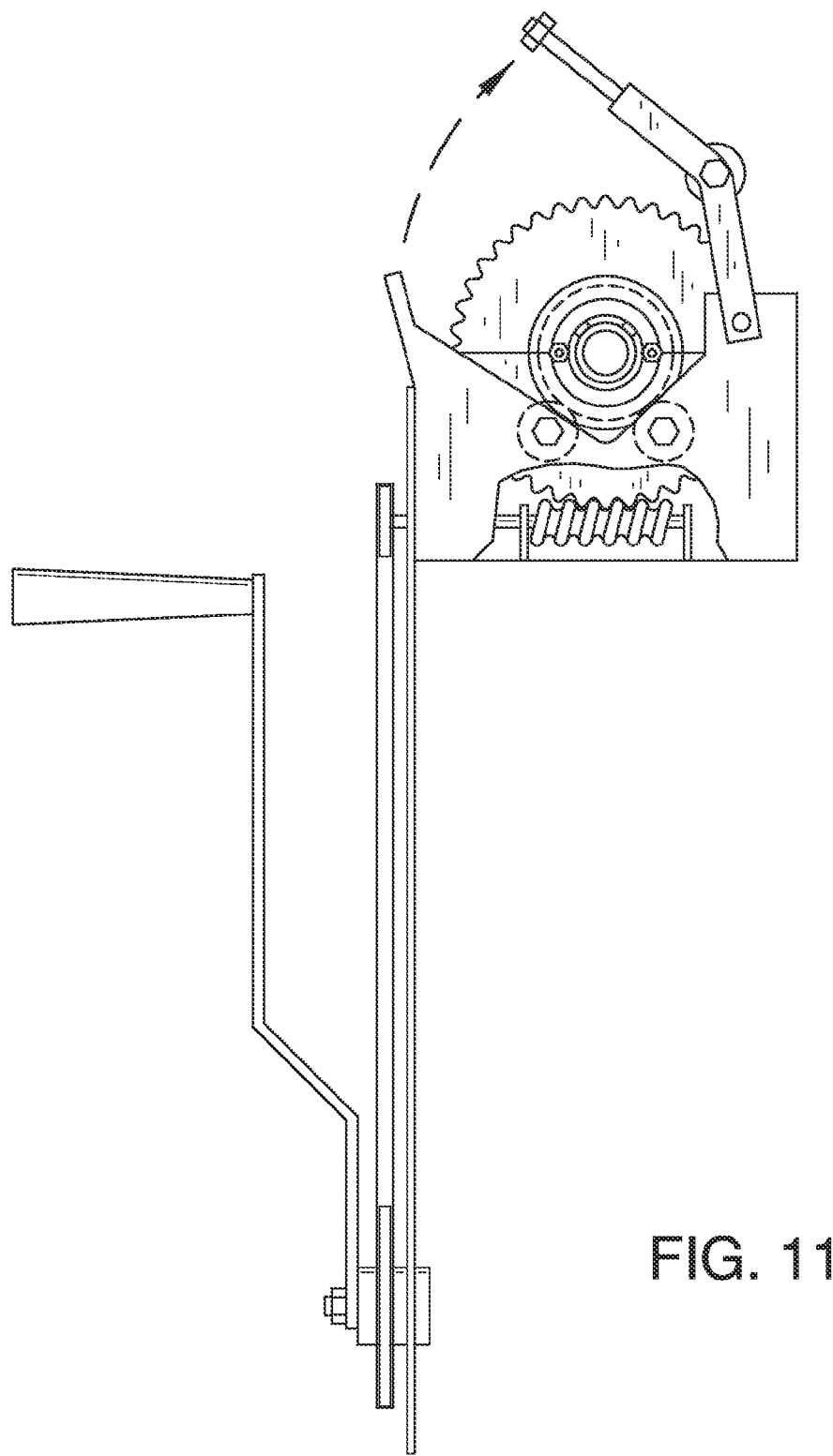
FIG. 11 is a side view of the winding tool of FIG. 9.

Referring now to FIG. 9-11, in some embodiments the winding tool 100 of the present invention alternatively comprises a belt rotatable via the handle component. Rotating the belt translates into the rotation of the cylindrical extension and winding cone.

In some embodiments, the winding tool 100 of the present invention further comprises a stabilization bar holding component 560 disposed on the winding box 150. The stabilization bar holding component 560 is designed to hold a stabilization bar. The stabilization bar can be used to hold the winding box 150 in place when it is in use, for example to prevent it from swinging about and/or hitting and damaging structures such as the garage door or the like. The stabilization bar, when attached to the winding box 150, may be positioned up against a structure (e.g., garage door). In some embodiments, no stabilization bar is needed.

The winding tool 100 of the present invention is adapted to be used for springs of either direction, for example right-handed springs and left-handed springs.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A winding tool comprising:
    a first half hub assembly comprising a first half cylinder having a first end and a second end, a first half translational sprocket is disposed generally perpendicularly on the first half cylinder in between the first end and the second end;
    a second half hub assembly comprising a second half cylinder having a first end and a second end, a second half translational sprocket is disposed generally perpendicularly on the second half cylinder in between the first end and the second end, the first half hub assembly removably interlocks with the second half hub assembly via a locking means to form a generally cylindrical structure with the first half translational sprocket and second half translational sprocket being aligned, the hub assemblies together function to wrap around a garage door shaft;

a first finger for removably engaging in a first finger cavity disposed on an inner surface of the first end of the first half cylinder, the first finger functions to engage a torsion spring winding cone;

a second finger removably engaging in a second finger cavity disposed on an inner surface of the first end of the first half cylinder, the second finger functions to engage the torsion spring winding cone;

a winding box removably attachable to the hub assemblies when the hub assemblies are interlocked, the winding box has an open top end, a middle portion, a bottom end, and an inner cavity, wherein an indentation is disposed in each a first side and a second side of the open top end of the winding box, the indentations are adapted to hold the first half cylinder and second half cylinder of the hub assemblies with the translational sprocket positioned in between the first side and second side of the winding box;

a clamp assembly for securing the winding box to the hub assemblies, the clamp assembly comprises a clamp lever pivotally attached to the winding box at the top end, the clamp lever wraps over the hub assemblies and engages a locking system to temporarily secure the winding box to the hub assemblies;

a worm gear disposed in the inner cavity of the winding box near the top end below the indentations, the worm gear has a first end and a second end, the worm gear is positioned such that teeth of the worm gear engage teeth of the translational sprocket when the huh assemblies are engaged in the winding box, wherein a first gear is disposed on the first end of the worm gear;

a winding shaft having a first end and a second end, a second gear is disposed on the first end of the winding shaft, the second gear engages the first gear disposed on the worm gear, and a third gear is disposed on the second end of the winding shaft; and a handle bar having a first end and a second end, a fourth gear is disposed on the first end, the fourth gear engages the third gear disposed on the second end of the winding shaft and the second end of the handle bar extends out of the winding box;

wherein when the handle bar is rotated the rotation of the handle bar causes the winding shaft to rotate, which causes the worm gear to rotate, which causes the translational sprocket to rotate, which causes the first half cylinder, first finger, second half cylinder, and second finger to rotate, and wherein rotation occurs in a first direction or a second direction.

2. The winding tool of claim 1, wherein the first half translational sprocket and second half translational sprocket together have 50 teeth.

3. The winding tool of claim 1, wherein the locking means for interlocking the first half hub assembly removably interlocks with the second half hub assembly and includes first half rings disposed on each the first end and second end of the first half cylinder and second half rings disposed on each the first end and second end of the second half cylinder, the first half rings removably interlock with the second half rings.

4. The winding tool of claim 3, wherein the half rings comprise either a tongue or a groove.

5. The winding tool of claim 1, wherein a pin is disposed on a first end of each the first finger and the second finger, the pin functions to engage a hole of the torsion spring winding cone.

6. The winding tool of claim 1, wherein the first finger or the second finger comprises a first bar generally perpendicularly attached to a second bar, the second bar is generally perpendicularly attached to a third bar.

7. The winding tool of claim 1 further comprising a first pair of bearings disposed in the inner cavity of the winding box near the top end on the first side of the winding box below the indentation, and a second pair of bearings disposed in the inner cavity of the winding box near the top end on the second side of the winding box below the indentation, the bearings contact the first half cylinder and second half cylinder of the hub assemblies when the hub assemblies are engaged in the winding box, and wherein the bearings allow the first half cylinder and second half cylinder to rotate.

8. The winding tool of claim 1, wherein the locking system is a latch component.

9. The winding tool of claim 1, wherein the clamp lever comprises a first half clamp lever and a second half clamp lever for respectively wrapping over the first ends of the first and second half cylinders and the second ends of the first and second half cylinders.

10. The winding tool of claim 9 further comprising a first upper bearing disposed on the first half clamp lever and a second upper bearing disposed on the second half clamp lever, the upper bearings contact the first and second half cylinders when the hub assemblies are engaged in the winding box, and wherein the upper bearings allow rotation of the first and second half cylinders.

11. The winding tool of claim 1, wherein the latch component comprises a clamp handle.

12. The winding tool of claim 1 further comprising a handle piece or a drill removably attachable to the second end of the handle bar.

13. The winding tool of claim 1 wherein worm gear and the half translational sprockets may provide a 50:1 ratio of rotation wherein for 50 rotations of the worm gear the half translational sprockets rotate once.

14. The winding tool of claim 1 further comprising a stabilization bar holding component disposed on the winding box.

* * * * *